No. 803,481. PATENTED OCT. 31, 1905.
J. HANKIN.
STEAM PIPE COLLAR.
APPLICATION FILED NOV. 17, 1904.
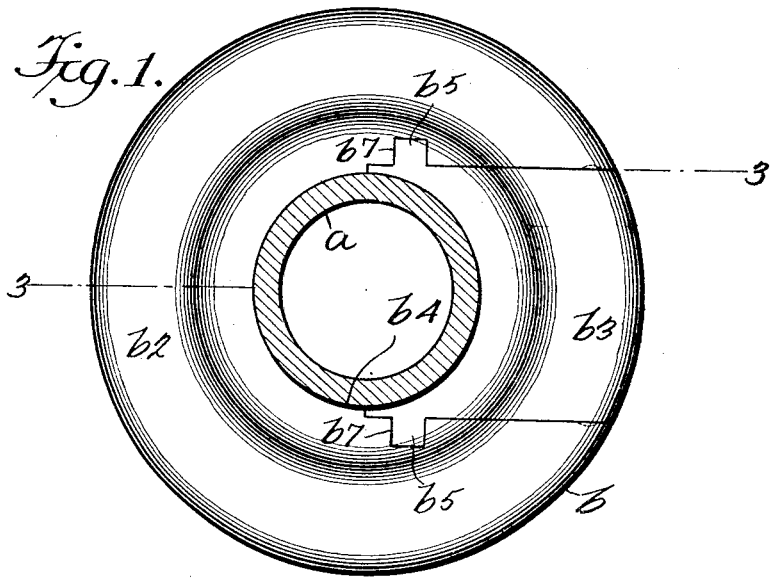
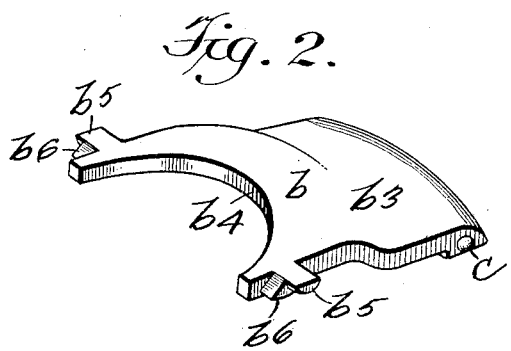
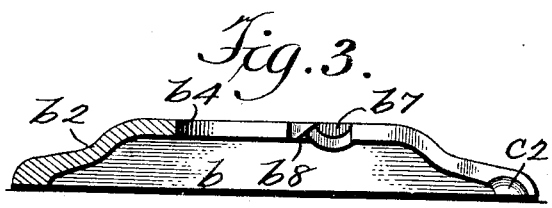
WITNESSES
INVENTOR
John Hankin
BY
Edgar Tate & Co.
ATTORNEYS

UNITED STATES PATENT OFFICE.

JOHN HANKIN, OF PASSAIC, NEW JERSEY.

STEAM-PIPE COLLAR.

No. 803,481.    Specification of Letters Patent.    Patented Oct. 31, 1905.

Application filed November 17, 1904. Serial No. 233,085.

*To all whom it may concern:*

Be it known that I, JOHN HANKIN, a citizen of the United States, residing at Passaic, in the county of Passaic and State of New Jersey, have invented certain new and useful Improvements in Steam-Pipe Collars, of which the following is a specification, such as will enable those skilled in the art to which it appertains to make and use the same.

This invention relates to finishing-plates or collars for steam-pipes; and the object thereof is to provide an improved device of this class designed to be connected with a steam-pipe where it passes through the floor or ceiling or through a partition, a further object being to provide a device of this class which may be connected with water-pipes, gas-pipes, or other pipes in house construction and which may be easily and conveniently connected with such pipes or removed therefrom whenever desired.

The invention is fully disclosed in the following specification, of which the accompanying drawings form a part, in which the separate parts of my improvement are designated by suitable reference characters in each of the views, and in which—

Figure 1 is a plan view of my improved steam-pipe collar or finishing-plate and showing a pipe in section; Fig. 2, a perspective view of a part of the collar or plate; and Fig. 3, a partial section of the main part of the collar or plate, the section being on the line 3 3 of Fig. 1.

In the drawings forming part of this specification I have shown at $a$ an ordinary steam, water, or gas pipe, and in the practice of my invention I provide a collar or finishing-plate $b$, which is adapted to be connected with said pipe where it passes through the floor, ceiling, or through a partition. The collar or plate $b$ in the construction shown is circular in form and is composed of two parts $b^2$ and $b^3$. The central opening $b^4$, through which the pipe $a$ passes, is formed partially in the part $b^2$ and partially in the part $b^3$, and the sides of the part $b^3$ are parallel and extend half-way around the central opening $b^4$ and are provided laterally of said opening with lugs or projections $b^5$, which are segmental in form on their under side in cross-section and each of which is provided with a downwardly and inwardly directed cam lug or projection $b^6$, and the part $b^2$ is provided with recesses $b^7$, adapted to receive the lugs or projections $b^5$, and with cam lugs or projections $b^8$, in connection with which the cam lugs or projections $b^6$ operate so as to form a lock to hold the parts $b^2$ and $b^3$ together. The part $b^3$ is also provided near its outer edge and at each side with small beveled or rounded projections $c$, which are adapted to enter recesses $c^2$ in the outer portion of the part $b^2$ and which are indicated in dotted lines in Fig. 1 and shown in full lines in Figs. 2 and 3.

The collar or plate $b$ as a whole is convex in cross-section substantially and is also undulated in cross-section or provided with an annular groove or grooves designed simply as ornamentation; but said plate or collar may be of any desired shape in cross-section.

The projections $c^2$ are very shallow and simply afford friction to hold the parts $b$ and $b^2$ together, and by applying force beneath the outer edge of the part $b^3$ it may be forced outwardly and the said part $b^3$ may be removed.

In connecting the collar or plate with a pipe the part $b^3$ is removed and the part $b^2$ is slipped onto the pipe and the part $b^3$ is then slipped back into position. This is done by inserting the cam lugs or projections $b^6$ downwardly through the recesses $b^7$ until the lugs or projections $b^5$ rest in said recesses. The outer edge of the part $b^3$ is then forced backwardly, and in this operation the cam lugs or projections $b^6$ engage the cam lugs or projections $b^8$ and the projections $c$ enter the recesses $c^2$ and the collar or plate is complete and may be moved on the pipe until it rests on the floor or presses against a partition or against a ceiling through which the pipe passes. The collar or plate may also be secured to a floor, ceiling, or partition by screws or bolts, if desired; but as a rule the friction between the collar or plate and the pipe will be sufficient to hold said collar or plate in position.

Although I have shown and described the sides of the part $b^3$ as parallel, it will be apparent that this is not absolutely necessary, as the operation would be the same if these sides were diverging, the only object in this connection being to provide an opening in the part $b^2$ of the collar or plate large enough to receive the pipe, and it will also be apparent that this device may be made of any desired size and applied to pipes of any dimensions.

This device is simple in construction and comparatively inexpensive, and, as will be seen, may be conveniently applied to pipes of the class specified wherever the latter are employed or wherever such finishing collars or plates are required.

Having fully described my invention, what I claim as new, and desire to secure by Letters Patent, is—

A finishing collar or plate for steam and other pipes provided with a central opening adapted to receive a pipe, and composed of two parts one of which is detachable from the other, the detachable part being provided near the end adjacent to said opening and on its opposite sides with laterally-directed projections which are segmental in cross-section and provided with downwardly and inwardly directed cam-lugs, and the other part being provided with recesses in its outer surface adapted to receive said projections, and with the inner sides of which said cam-lugs are adapted to engage, the said detachable part being also provided at its opposite sides and near its outer edge with rounded knobs or projections, and the other part being provided with correspondingly-located recesses adapted to receive said knobs or projections, substantially as shown and described.

In testimony that I claim the foregoing as my invention I have signed my name, in presence of the subscribing witnesses, this 15th day of November, 1904.

JOHN HANKIN.

Witnesses:
C. E. MULREANY,
C. J. KLEIN.